(12) United States Patent
Dutta et al.

(10) Patent No.: US 12,199,864 B2
(45) Date of Patent: Jan. 14, 2025

(54) SYSTEM AND METHOD OF INTELLIGENT EDGE ROUTING

(71) Applicant: JIO PLATFORMS LIMITED, Gujarat (IN)

(72) Inventors: Debashis Dutta, Mumbai (IN); Chandan Maity, Mumbai (IN); Shivraj Dagadi, Bangalore (IN); Anish Shah, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 438 days.

(21) Appl. No.: 17/649,868

(22) Filed: Feb. 3, 2022

(65) Prior Publication Data

US 2022/0255858 A1 Aug. 11, 2022

(30) Foreign Application Priority Data

Feb. 5, 2021 (IN) .............................. 202121004970

(51) Int. Cl.
| | |
|---|---|
| *H04M 3/00* | (2024.01) |
| *H04L 12/66* | (2006.01) |
| *H04L 45/00* | (2022.01) |
| *H04L 45/121* | (2022.01) |

(Continued)

(52) U.S. Cl.
CPC ............ *H04L 45/60* (2013.01); *H04L 45/121* (2013.01); *H04L 45/22* (2013.01); *H04L 45/34* (2013.01)

(58) Field of Classification Search
CPC ....... H04W 40/02; H04W 92/20; H04W 4/06; H04W 72/30; H04W 88/085; H04W 92/12; H04W 4/029; H04L 69/22; H04L 12/189; H04L 45/16; H04L 45/22
See application file for complete search history.

(56) References Cited

U.S. PATENT DOCUMENTS

| | | | |
|---|---|---|---|
| 2009/0109933 A1* | 4/2009 | Murasawa | .......... H04L 63/0428 370/335 |
| 2011/0205959 A1* | 8/2011 | Aalto | .................... H04W 8/082 370/328 |

(Continued)

*Primary Examiner* — Kharye Pope
(74) *Attorney, Agent, or Firm* — FINNEGAN, HENDERSON, FARABOW, GARRETT & DUNNER, LLP

(57) ABSTRACT

The present disclosure provides Edge solution that can introduce/incorporate certain intelligence at the Base Node or PGW/UPF to take decision by routing the requests originating from UE. Embodiments of the present disclosure relate to a method that includes parsing of Data-Packet from UE at Base Node or PGW/UPF; Storage of Configuration parameters at Base Node or PGW/UPF and Execution of Routing algorithm at Base Node or PGW/UPF. The disclosure further provides solution as architectures of Intelligent Routing Ability involving base-node or PGW, wherein the routing ability is achieved at Base Node or PGW/UPF with required configuration, routing decision etc., stored at Base Node or PGW/UPF itself and includes Parsing of data packets coming from user equipment (UE) to Base Node or PGW/UPF to find source and destination address or IP, Storage of possible alternate destination information for desired services/application/content in "local configuration file" at Base Node or PGW/UPF.

22 Claims, 11 Drawing Sheets

(51) Int. Cl.
*H04L 45/60* (2022.01)
*H04M 5/00* (2006.01)

(56) References Cited

U.S. PATENT DOCUMENTS

| | | | |
|---|---|---|---|
| 2012/0314689 A1* | 12/2012 | Wang | H04W 36/12 370/331 |
| 2013/0051316 A1* | 2/2013 | Bhatt | H04W 92/20 370/328 |
| 2015/0110003 A1* | 4/2015 | Wilkinson | H04L 45/54 370/329 |
| 2018/0097657 A1* | 4/2018 | Dao | H04L 41/0893 |
| 2018/0227219 A1* | 8/2018 | Zhang | H04W 28/0273 |
| 2019/0124580 A1* | 4/2019 | Lu | H04W 76/12 |
| 2019/0273813 A1* | 9/2019 | Mirsky | H04L 69/22 |
| 2020/0229021 A1* | 7/2020 | Zheng | H04W 76/12 |
| 2022/0038490 A1* | 2/2022 | Thakur | H04L 63/1425 |

* cited by examiner

SYSTEM AND METHOD OF INTELLIGENT EDGE ROUTING

TECHNICAL FIELD

The present disclosure relates to communication system and more particularly to base-node (eNodeB or gNodeB) with intelligent module to take decision for efficient routing in 4G, LTE and 5G

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The wireless telecom network infrastructure is the most vital communication backbone than other means of connectivity for end to end delivery of data or content to user and other internet connected devices or machines. The digital technique in telecommunication network has evolved from GPRS/2G to now LTE and towards 5G. In this category of wireless communication, the data passes through two major distinguished networks viz. i) Telecom network or backhaul and ii) Internet network or ICT (Information and Communication Technology) to reach the remote destination where desired service or content is available.

Most of the existing telecom networks are very tightly coupled with specific sets of hardware and software which are not designed to be scaled up rapidly like ICT infrastructure. The interoperability of these telecom backhaul subsystems are also very limited.

In existing and conventional telecom network, communication between UE (User Equipment) and deployed services/applications is established through many intermediate nodes. The Base Node receives data from UE and simply passes the data packet to upper nodes in hierarchy of Telecom backhaul and then to complex Internet network till it reaches to the specific service/application server hosted remotely. The reply or response data packets follow almost the same return path and finally reaches back to the specific UE.

In the mobile communication, the very first node to which UE directly communicates is the base-node (eNodeB in case of LTE or gNB in case of 5G). Currently, these base nodes as well as other nodes like Service Gateway (SGW) and Packet Gateway (PGW) or User Plane Function (UPF) etc. simply work as transparent gateway for incoming & outgoing data packets and do not parse, process or interpret the requested data originated from UE.

In order to fulfil the requirements of bandwidth-intensive content, latency sensitive application and also to support increasing number of internet connected devices, the required ICT infrastructure are being continuously scaled up. However, the scaling in telecom infrastructure has not happened at the same pace to address the requirements mentioned above.

At present, there is no solution available for efficient routing-capability at either Base Node or PGW which is one of the key elements of "Edge computing" concept in core telecom network. Currently, there are no solutions available for efficient routing-capability with minimal resource requirements as per need of telecom backhaul infrastructure that can support lower data transport time (latency), increase data availability, reduce bandwidth, whereby computing and storage resources are made available on the Edge. Also, there are no solution available to arm the conventional base nodes with certain additional functionalities such as route, compute and storage for incorporation of intelligence.

There are currently several challenges in the existing system which are listed as follows:

There is no Edge solution available that can introduce/incorporate certain intelligence at the Base Node so as to empower it with the ability to take decision by routing the requests originating from UE to reach the final destination.

There is no Edge solution available that can introduce/incorporate certain Intelligence in both Base Node as well as in PGW or UPF to achieve the efficient routing.

There is no Edge solution available at Base Node or PGW or UPF that may provide reduction in latency for accessing data, which in turn, shall provide better user experience and enhance QoS (Quality of service).

There is no Edge solution available that provides low bandwidth requirement at telecom-backhaul as well as Internet or centralized server/cloud network to serve more user requests. However, a slight upgradation in the core infrastructure may be required.

There is no Edge solution available that provides increase in data privacy and security by restricting data availability at limited geographical and logical area.

There is therefore a need for an advancement for efficient routing-capability at either Base Node or PGW or UPF which is one of the key elements of "Edge computing" concept in core telecom network.

This disclosure proposes for efficient routing-capability at either Base Node or PGW/UPF, a key element of "Edge computing" concept in core telecom network.

OBJECTS OF THE PRESENT DISCLOSURE

Some of the objects of the present disclosure, which at least one embodiment herein satisfies are as listed herein below.

An object of the present disclosure is to provide an Edge solution that can introduce/incorporate certain intelligence at the Base Node so as to empower it with the ability to take decision by routing the requests originating from UE to reach the final destination.

An object of the present disclosure is to provide an Edge solution that can introduce/incorporate certain Intelligence in both Base Node as well as in PGW/UPF to achieve the efficient routing.

An object of the present disclosure is to provide an Edge solution that may provide reduction in latency for accessing data, which in turn, shall provide better user experience and enhance QoS (Quality of service).

An object of the present disclosure is to provide an Edge solution that provides low bandwidth requirement at telecom-backhaul as well as Internet or centralized server/cloud network to serve more user requests with same infrastructure.

An object of the present disclosure is to provide an Edge solution that enables increase in data privacy and security by restricting data availability at limited geographical and logical area.

An object of the present disclosure is to provide an Edge solution help create infrastructure for computation and storage platforms to cater next generation applications such as Block-chain based solution, distributed computing, Localized network based industrial IoT solution etc.

An object of the present disclosure is to provide a mechanism to achieve routing decision making ability at Base Node in the telecom network.

An object of the present disclosure is to provide a new routing technique that shall directly or indirectly help to achieve low latency to access data by Fast delivery of services, applications and content, reduced DNS (Domain Name System) resolve time and localized consumer and industrial IoT.

An object of the present disclosure is to provide a new routing technique that facilitates bandwidth utilization by effectively using MNO to serve more users as some of the load is handled at Base Node level itself and thereby reducing load on service/application provider.

An object of the present disclosure is to provide a new routing technique that facilitates security by achieving distributed and localized security and privacy, adhering to government's General Data Protection Rules (GDPR) and security against cyber-attacks like DDOS etc.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

SUMMARY

Figure 1:
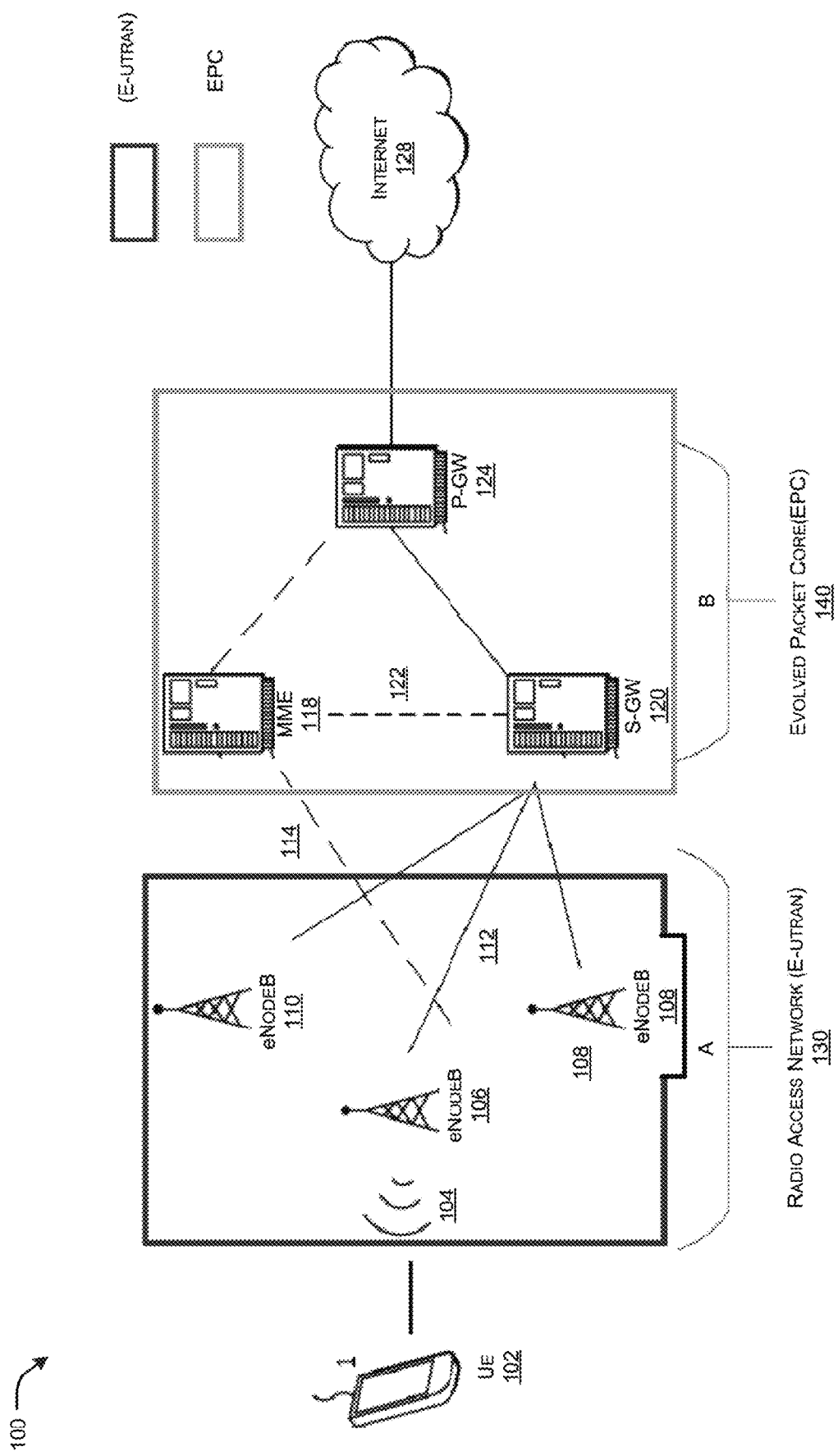
FIG. 1 illustrates existing High Level Network Architecture in accordance with an embodiment of the present disclosure.

This section is provided to introduce certain objects and aspects of the present disclosure in a simplified form that are further described below in the detailed description. This summary is not intended to identify the key features or the scope of the claimed subject matter.

An aspect of the present disclosure provides for a system facilitating efficient routing in a telecommunication network. The system may include one or more user equipment (UE) communicatively coupled to a radio network that may include a first architecture and characterized in that: a plurality of base nodes and one or more packet gateway nodes; an edge module operatively coupled to one or more base nodes. The edge module may include a processor that executes a set of executable instructions that are stored in a memory, upon which execution, the processor causes the system to: receive from the one or more UE a data packet for a destination computing device. The data packet associated for a request of a predefined service from the destination computing device. The processor may further cause the system to parse, the data packet received for a first set of attributes pertaining to the destination computing device; extract, the first set of attributes pertaining to the destination computing device; determine a fastest route to said destination computing device from the first set of attributes extracted and a predefined set of instructions; and route, the data packet to the destination computing device through the fastest route.

In an embodiment, if the first set of attributes pertaining to the destination computing device are absent, the edge module may fetch a current available configuration to check if the data packet is required to be forwarded to a core network or to any nearby base node.

In an embodiment, a second architecture comprises of the core network, wherein the core network further comprises an edge module operatively coupled to the one or more packet gateway nodes, wherein the edge module is configured to: receive from said one or more base nodes a data packet for a destination computing device; parse, the data packet received for a first set of attributes pertaining to the destination computing device and a second set of attributes pertaining to authentication and security of the data packet; extract, the first set of attributes and the second set of attributes pertaining to the destination computing device; determine a fastest route to the destination computing device from the first set of attributes extracted and a predefined set of instructions; and route, said data packet to the destination computing device through the fastest route and the edge module coupled to the packet gateway node enables storage of configuration parameters at the plurality of base nodes.

In an embodiment, the core network further comprises one or more packet gateway nodes, Mobility Management Entity (MME), Serving Gateway (S-GW) nodes, Home Subscriber System (HSS) and a combination thereof.

In an embodiment, the first architecture may be used with first set of attributes where authorization and other functionalities (such as policy enforcement, charging and LEA interception etc.) may be achieved through some other mechanism. In a third architecture, both base node and packet gateway can be equipped with edge element and request can be served from either of the place with routing configuration are available at both the places.

In an embodiment, in the second architecture where initially packet goes to packet gateway and edge element connection information is received in the response. Subsequently, if there is a request for same service by the same device/address then base node itself takes decision for routing. In an embodiment, the first set of attributes pertaining to the destination computing device comprises source IP address, Destination IP address, and Payload.

In an embodiment, the first architecture and the second architecture may handle a request response handshaking communication.

In an embodiment, the packet gateway or user plane function node of the second architecture may store more than one base node's configuration without a need to store a plurality of local configurations at each and every base node individually.

In an embodiment, based on the first and second set of attributes, the packet gateway node may make a decision to either forward the data packet to internet or a local network or forward a response immediately back to the corresponding base node from which the packet gateway node received the data packet or any other adjacent node which can process the request.

In an embodiment, the packet gateway or user plane function node may perform a first set of predefined instructions sending the response to the base node, wherein the packet gateway/User plane function node may also send edge connection details along with the response, wherein on receiving the response packet from the packet gateway node, the corresponding base node may check for an edge flag in the data packet, wherein if the edge flag is true, the data packet may be processed locally.

An aspect of the present disclosure provides for a method facilitating efficient routing in a telecommunication network. The method may include the steps of receiving from one or more UE a data packet for a destination computing device, wherein one or more user equipment are communicatively coupled to a radio network that may include a first architecture and characterized in that a plurality of base nodes and one or more packet gateway or user plane function nodes and an edge module operatively coupled to one or more base nodes, wherein said data packet is associated with a request of a predefined service from the destination computing device. The method may also include the steps of parsing, the data packet received for a first set of attributes pertaining to the destination computing device; extracting, the first set of attributes pertaining to the destination computing device; determining a fastest route to said destination computing device from the first set of attributes extracted; and routing, said data packet to the destination computing device through said fastest route.

In an embodiment, a second architecture may comprise of an edge module operatively coupled to the one or more packet gateway nodes, wherein the edge module is configured to perform the steps of receiving from said one or more base nodes a data packet for a destination computing device; parsing, the data packet received for a first set of attributes pertaining to the destination computing device and a second set of attributes pertaining to authorization and security of the data packet; extracting, the first set of attributes and the second set of attributes pertaining to the destination computing device; determining a fastest route to said destination computing device from the first set of attributes extracted; and routing, the data packet to the destination computing device through said fastest route.

DETAILED DESCRIPTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein. Example embodiments of the present invention are described below, as illustrated in various drawings in which like reference numerals refer to the same parts throughout the different drawings.

In an aspect, the present disclosure relates proposes method of Intelligent Routing ability at Base Node or PGW in Telecom network.

Embodiments of the present disclosure may relate to a method of Intelligent Routing ability at Base Node in Telecom network. The method includes parsing of Data-Packet from UE at Base Node; Storage of Configuration parameters at Base Node and Execution of Routing algorithm at Base Node. The disclosure further provides solution as first architecture of Intelligent Routing Ability involving base-node only, wherein the routing ability is achieved at Base Node with required configuration, routing decision etc., stored at Base Node itself and includes Parsing of data packets coming from user equipment (UE) to Base Node to find source and destination address or IP, Storage of possible alternate destination information for desired services/application/content in "local configuration file" at Base Node and Execution of routing method to route the data packet from original destination address to new address as per information in "Local configuration file".

Further, the embodiments of the present disclosure may relate to solution as second architecture of Intelligent Routing Ability involving PGW or a user plane function (UPF) wherein, the routing ability is achieved at collectively by serving PGW/UPF and with required configuration, routing decision etc. are stored at PGW/UPF and includes the PGW/UPF to inspects incoming packet from UE, local process the request at serving base station itself, store possible alternate destination information for desired services/application/content in "local configuration file" at PGW/UPF, based on the configuration information available at PGW/UPF, routing decision is made and response packet with connection information is sent to serving Base Node. Thereafter, base node makes connection with locally available resources.

In an aspect, FIG. 1 illustrates high Level Network Architecture of wireless LTE Network according to various aspects of the Invention. As shown in the FIG. 1, the network consists of the following major entities as: FIG. 1 illustrates various sub-systems/modules of the Network architecture in accordance with various aspects of the invention.

User Equipment (102) (interchangeably referred to as the UE (102) hereinafter)
Evolved UMTS Terrestrial Radio Access Network (130) (E-UTRAN (130))
Evolved Packet Core (140) (EPC 140)

These three main components or sub-systems collectively achieve the goal of data communication and for delivering services/applications/contents. User Equipment (102): A User equipment is the one which directly interacts with one or more base nodes (106, 108, 110) (also referred to as eNodeB and interchangeably referred to as base station (106, 108, 110) or cell tower (106, 108, 110) to send and receive data over Radio Link using inbuilt antenna. The UE (102) can be a usual mobile handset or an embedded device with inbuilt MODEM (Modulation-Demodulation)/module for communication. As shown in FIG. 1, the block-1 or the UE communicates with an eNodeB over the Radio Link.

Evolved Radio Access Network (130) (E-UTRAN (130)): It is the front end of the telecom network (Block A in FIG. 1) which handles the connectivity with user equipment. It also handles the activities such as handover, load balancing etc. with the help of evolved packet core (EPC). The Radio access network works as a gateway between user equipment and core network (EPC). As shown in the FIG. 1, eNodeB (102) interacts with telecom core network as well as to user equipment for relaying packets coming to it.

Evolved Packet Core (EPC) (140): Evolved Packet Core (EPC), also called as Core network (140), is the most important module (130 in FIG. 1) in the telecom network. The major sub-modules under EPC are: Mobility Management Entity (MME), Serving Gateway (S-GW), Packet Gateway (interchangeably referred to as P-GW), Home Subscriber System (HSS) and the like. The main function of Evolved Packet Core (EPC) is to manage various operations associated with UE, such as: mobility, authentication, validation etc. Another major function of EPC is to interface between external packet data network and Radio Access Network to transfer data for various services/applications and contents.

Figure 2:
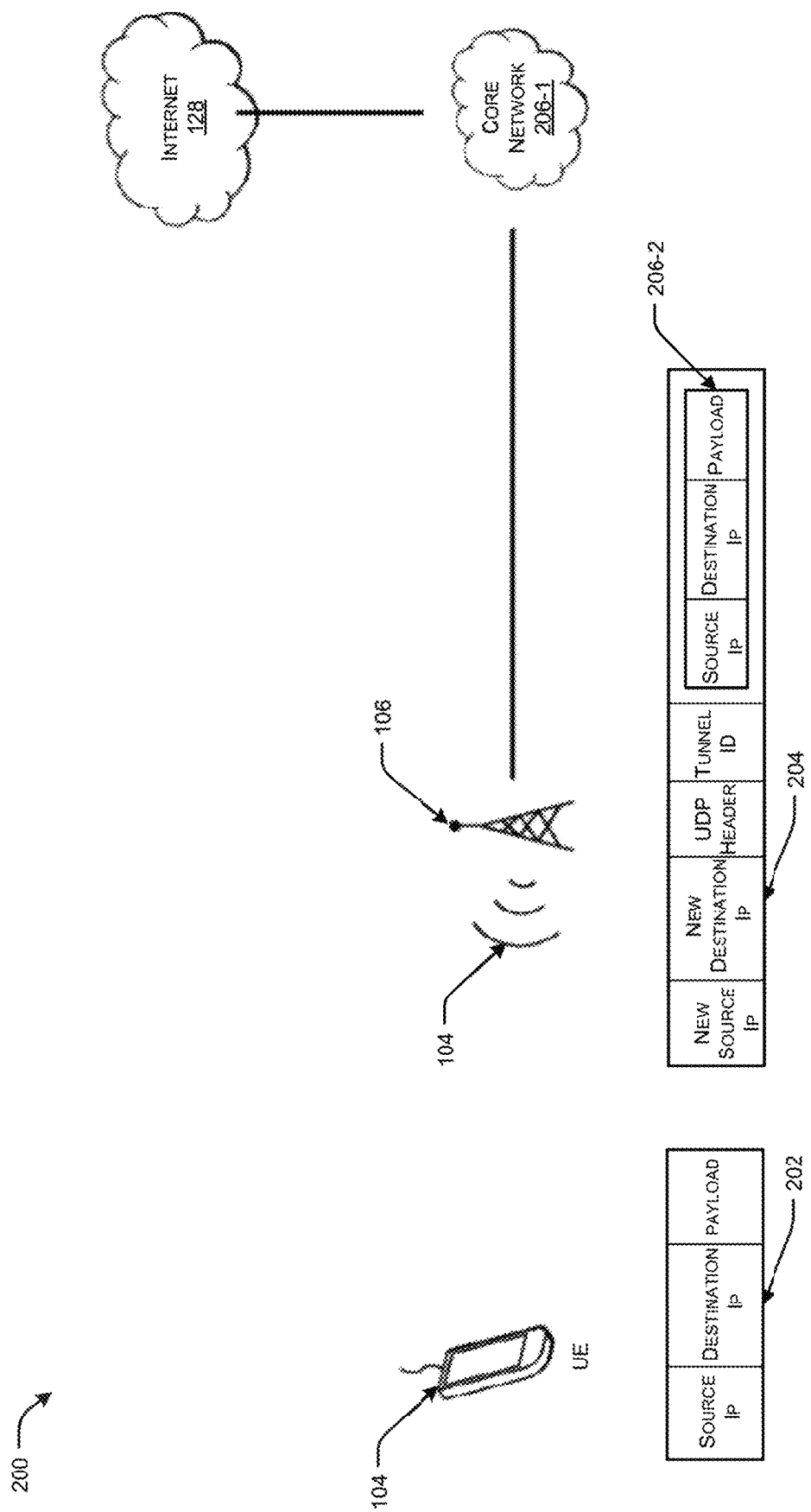
FIG. 2 illustrates IP packet tunneling at eNodeB in current scenario in accordance with an embodiment of the present disclosure.

FIG. 2 illustrates the details of the IP packet tunneling at eNodeB in current scenario according to various aspects of the Invention. In existing LTE network, requests coming from UE (102) are forwarded or relayed to Evolved Packet Core (140) for further processing. The serving eNodeB does not parse the incoming messages or requests.

The serving eNodeB (106) creates an encapsulated packet with a point-to-point logical tunnel (associated by tunnel-ID) and forwards the packet to next node in core network (206) (as shown in the FIG. 2) with the source and destination IP are set to serving eNodeB and address of next node respectively.

Figure 3:
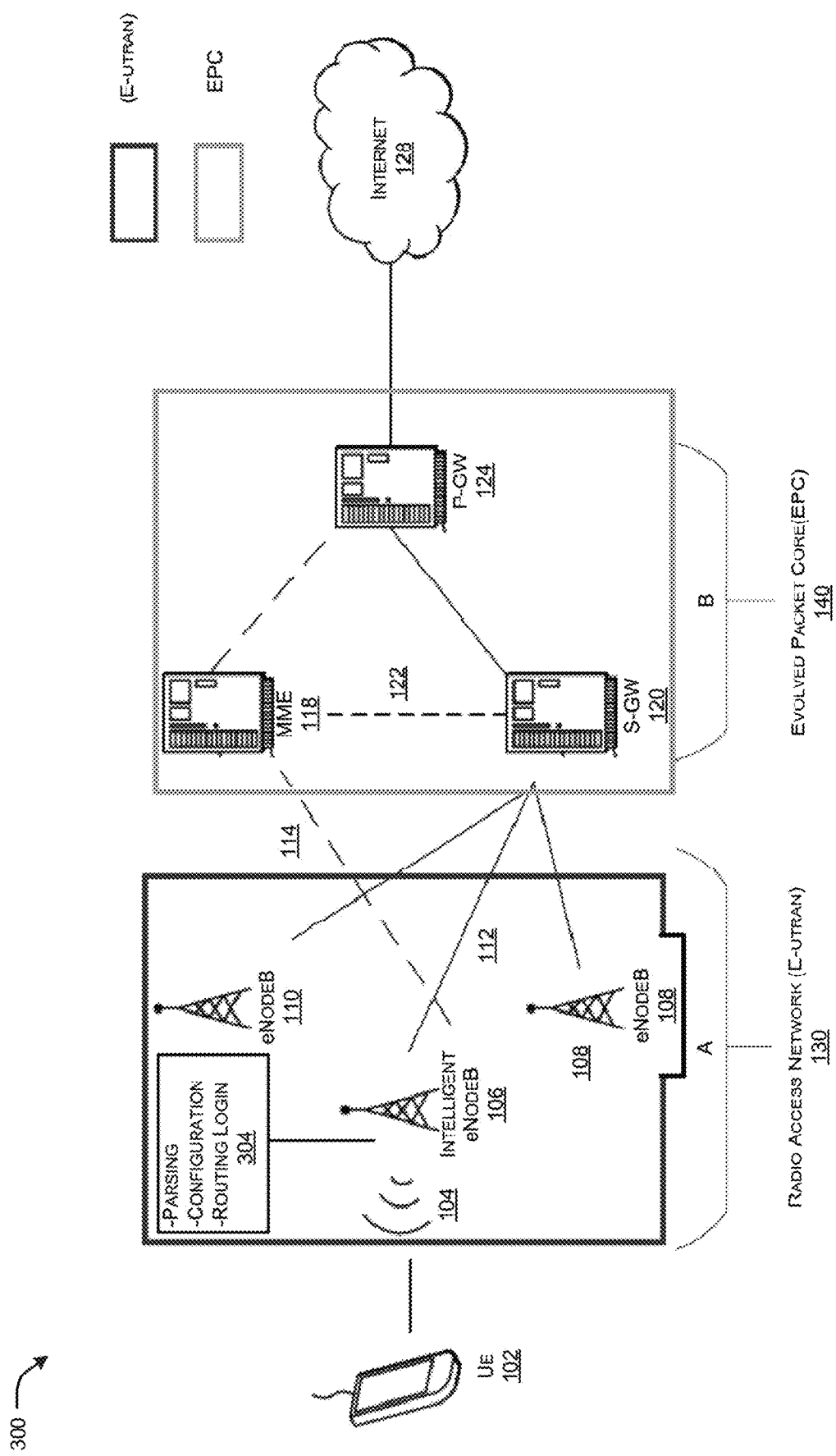
FIG. 3 illustrates High Level Network Architecture Solution I with Intelligent Routing Block at eNodeB in accordance with various aspects of the Invention.

In one of the exemplary embodiments, the proposed Architecture as shown in FIG. 3 for the intelligent routing ability involving base node only is detailed as below.
Solution Architecture-I Intelligent Routing Ability Involving Base-Node (eNodeB) Only:

In the proposed architecture, the base node (also interchangeably referred to as eNodeB) is now called coupled with an edge module and may be referred to as base node (302) (also referred to as intelligent eNodeB (302)) as it possesses the ability to make routing decisions with the inclusion of "Intelligent Routing Block" (304 as in FIG. 3). The proposed intelligent eNodeB (302) may now parse packets originating from UE (102) and may extract the required information for routing. The information mainly consists of: source IP, destination IP and payload. With the help of the local routing configuration information as available in Table-1 below (IP address of destination, available services/application/content and the like), the intelligent eNodeB can make a routing decision. The payload information may be extracted, but never altered or processed and those are attached with new packet (with updated address as per routing scheme).

TABLE 1

Proposed Configuration information at eNodeB for the purpose of Routing

| Destination IP Address | If Service/ Application Available (YES/NO) | List of Application |
|---|---|---|
| <IP-1> | <YES/NO> | <Application/Service/Content-1> <Application/Service/Content-2> . . . |
| <IP-2> | <YES/NO> | <Application/Service/Content-1> <Application/Service/Content-2> . . . |
| <IP-3> | <YES/NO> | <Application/Service/Content-1> <Application/Service/Content-2> . . . |

Solution I: Proposed IP Packet Routing in LTE Network at eNodeB

Figure 4:
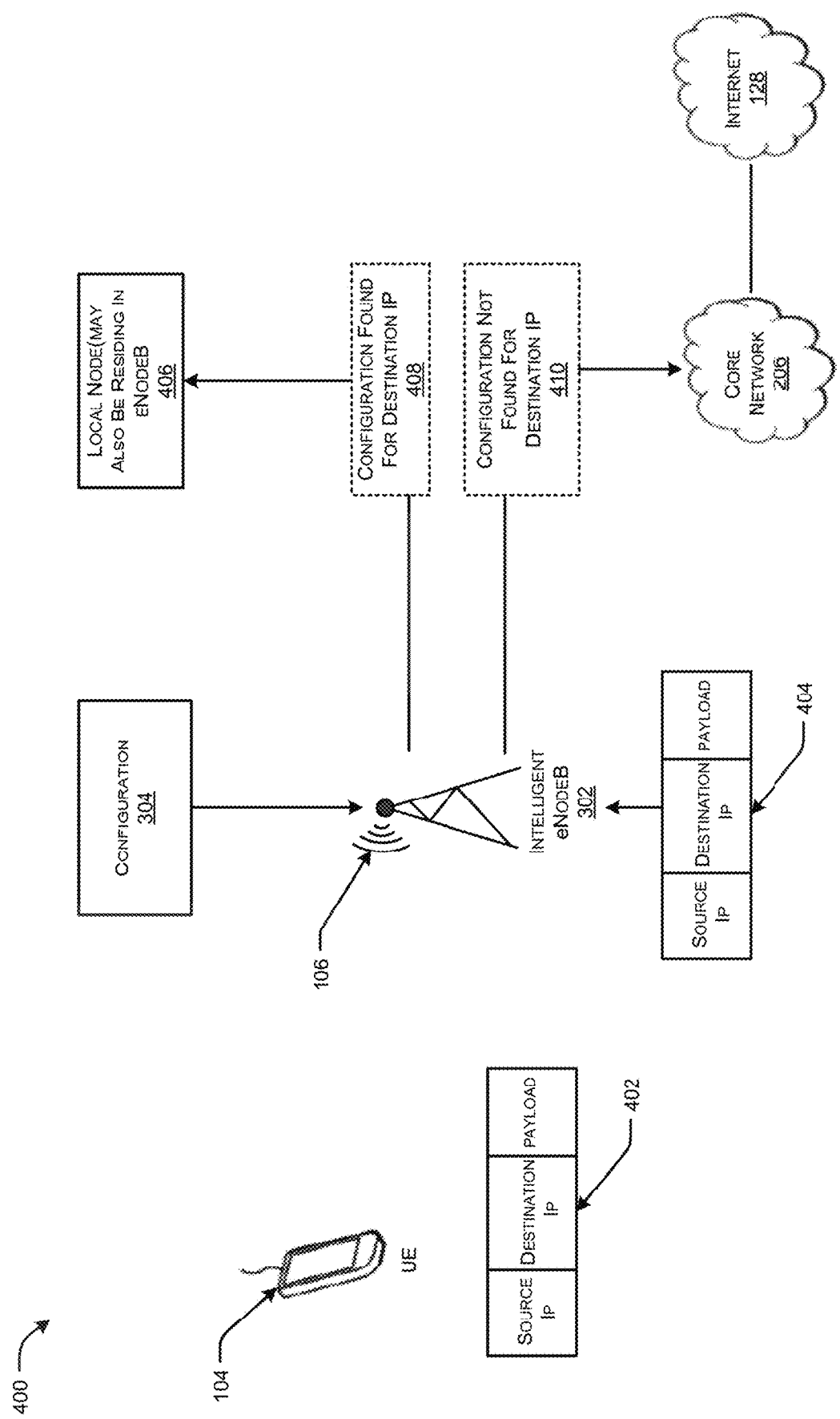
FIG. 4 illustrates solution flow for IP Packet Routing Decision Making at eNodeB in accordance with an embodiment of the present disclosure.

The flow and movement of data packets, the storage of configuration parameters and making of routing decisions proposed in the innovation, are depicted in FIG. 4.

In the proposed method, a "minimal" routing of data takes place at the base nodes itself which is not performed in the existing conventional telecom network. A request data packet (402) may originate from UE (102) consisting of its own IP address, Destination IP address and payload reaches at serving eNodeB (302) though RF (Radio Frequency) channel (106) as shown in FIG. 4. On reaching at intelligent eNodeB, unlike in the conventional telecom network, the data packets are parsed to extract following information:
  Source IP address
  Destination IP address (IP address of the target server from which the desired service/application or content is requested)
  Payload As indicated in FIG. 4, after extraction of the information, the intelligent eNodeB (302) may fetch a current available configuration (304) to check if the packet is required to be forwarded to Evolved Packet Core (140) or to any nearby eNodeB or can be processed locally. If there is no information available in the current configuration file available at the eNodeB for a particular destination IP, then it simply forwards the packet to EPC as per conventional technique (410) and no action may be required at the eNodeB.

Figure 5:
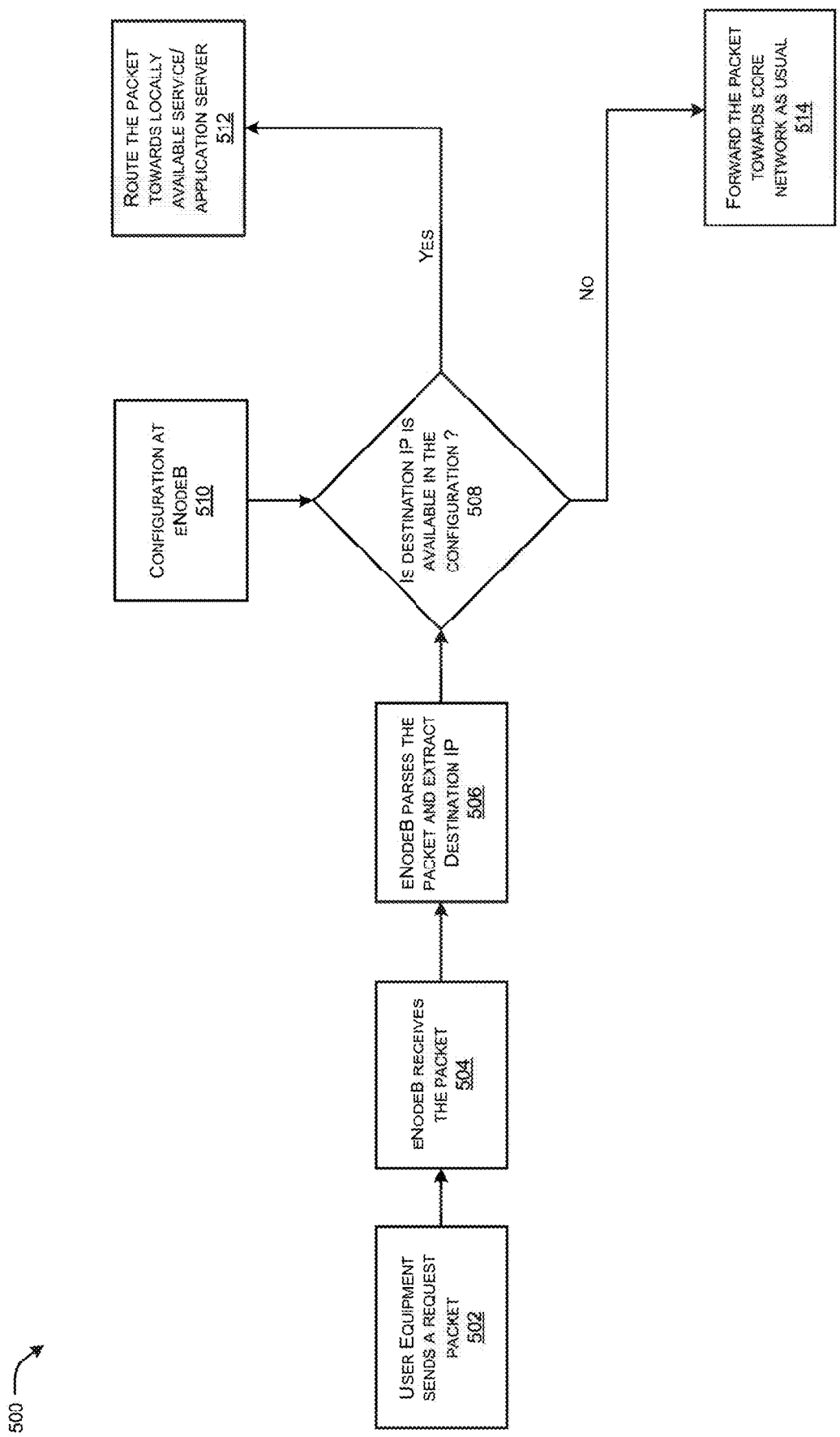
FIG. 5 illustrates an exemplary High Level Process Diagram for Logical Flow for routing in accordance with an embodiment of the present disclosure.

For the sake of clarity, a diagram depicting the data flow and process of making the routing decisions is shown in FIG. 5. As per the flow chart as indicated in FIG. 5, the UE sends a request packet (502), and then the eNodeB receives the data packet (504) and parses the packet and extracts the destination IP (506), if there is an entry available in the current configuration (510) at the eNodeB for a particular IP (508), then the packet will be processed locally (at same eNodeB or connected eNodeB as indicated in 512) else, the packet will be forwarded to the Evolved Packet Core (514).
Proposed Protocol Stack in Intelligent eNodeB In another embodiment, the proposed way of routing may be achieved through making changes in the existing eNodeB. As shown in the FIG. 6, an edge element (620) may be attached to the eNodeB (302). THE UE (102) may include configuration details as L1 (602), MAC (604), RLC (606), PDCP (608), IP (610). Once the IP packet is decompressed and deciphered at PDCP layer of eNodeB (608) in the eNodeB stack, it is checked if request can be processed locally at edge element or not, based on the local configuration information available at eNodeB. If it is found that the request can be serviced locally then the packet shall be forwarded towards edge element (Via 608 to 610) else it shall be forwarded towards network interface module of enodeB (Via 618 to 622).

Solution II—Architecture-2 Intelligent Routing Ability Involving Base-Node and P-GW In another embodiment, for a proposed second Architecture, the routing decisions may be made at the P-GW (702) and may have the required configuration stored on the P-GW (702) (format of configuration may be considered same as mentioned in the first Architecture). The difference is that instead of the eNodeB, now the P-GW (702) may store more than one base node's configuration and there may not be any need to store multiple local configurations at each and every base node individually.

In an exemplary embodiment, the second architecture may let flow of the packets to gateway node. The Gateway node then makes a decision to forward to either same base node or other based node to which edge is attached. In such cases, latency may be higher than in the case of the first architecture.

Figure 7:
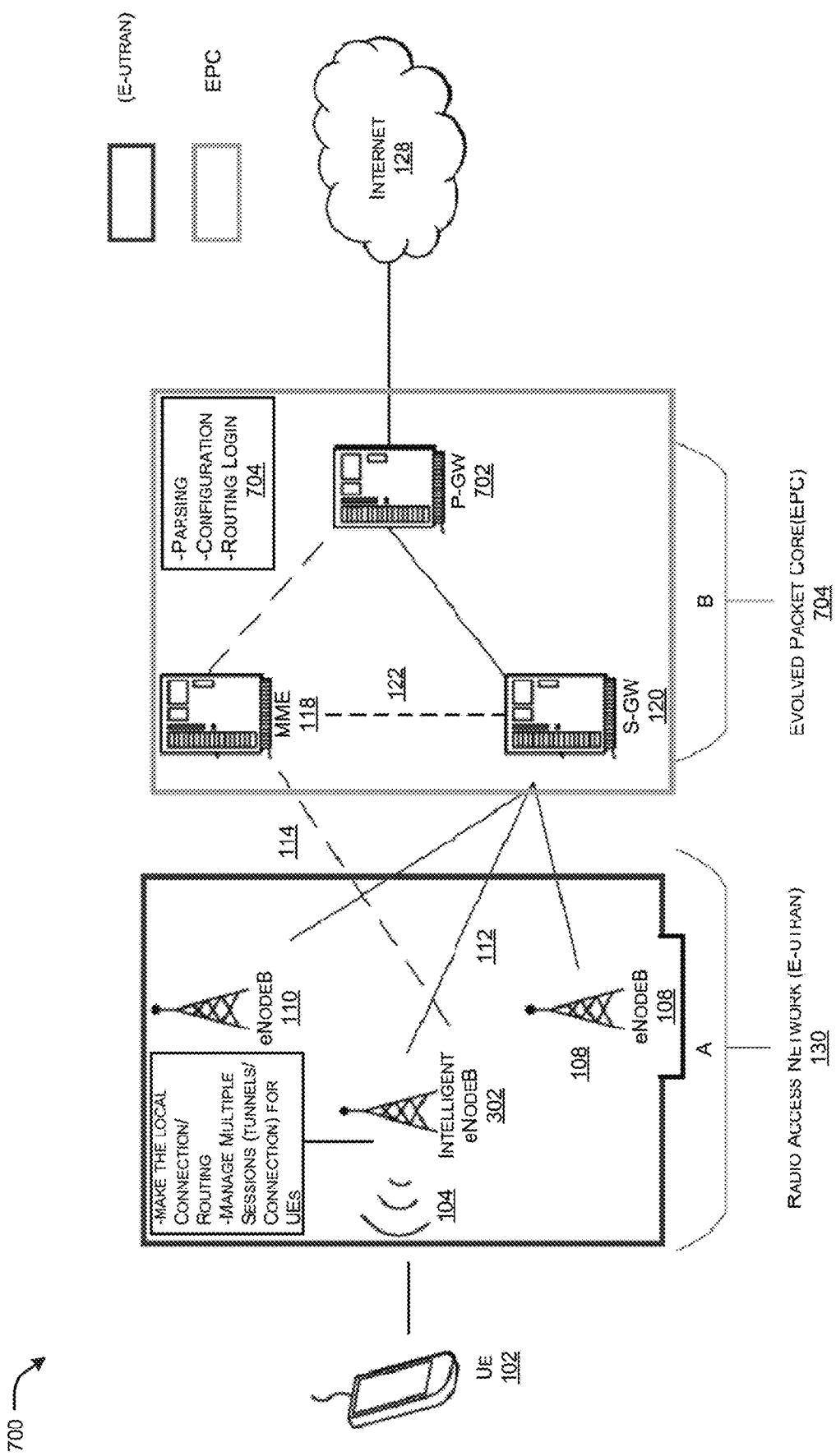
FIG. 7 illustrates an exemplary proposed High Level Network Architecture Solution II of Intelligent Routing Block at PGW and eNodeB in accordance with an embodiment of the present disclosure.

In a third architecture, the eNodeB (302) and the P-GW (702) as shown in FIG. 7 below achieve intelligent routing (702) collectively. Although the current architecture talks about serving intelligent eNodeB in association with P-GW collectively achieve the intelligent routing ability, however it may also be extended to other configuration such as routing to edge element connected to other eNodeB than the serving base station/eNodeB.

Figure 8:
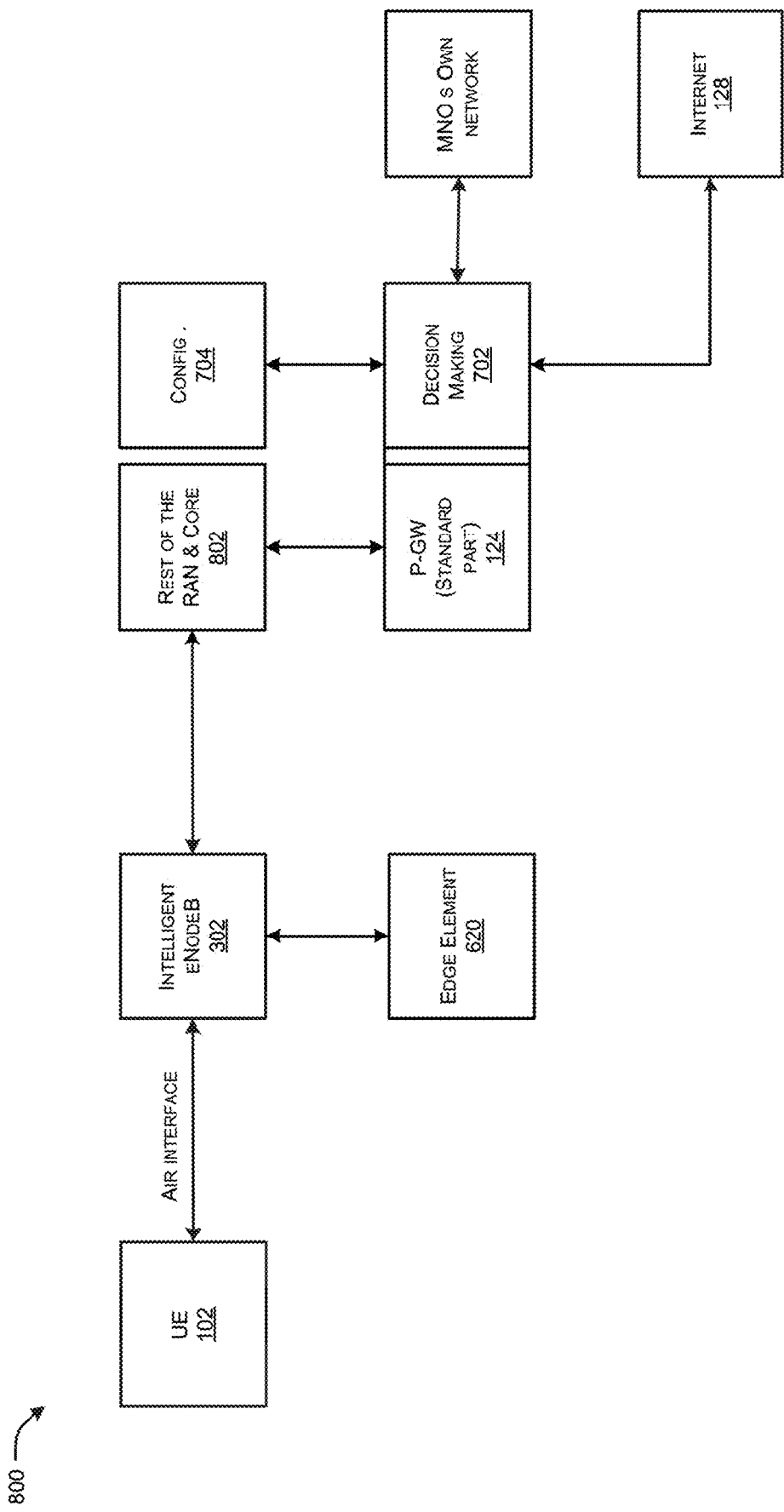
FIG. 8 illustrates an exemplary proposed Solution II Flow for IP Packet Routing Decision Making at eNodeB and PGW in accordance with an embodiment of the present disclosure.

In this architecture, the IP packets sent from the UE may be received at serving eNodeB or base station (302). As illustrated in FIG. 8, the UE (102) may send the data packet to the enodeB (302) operatively coupled to the edge module (620). As per the flow, for first time, the serving eNodeB (302) simply may forward the received packet to the (P-GW) (702) if the serving eNodeB does not have any edge or local configuration available for the request in its configuration available in memory. The packet may be inspected and processed by P-GW (124 and 702 in FIG. 8). It checks for the configuration details against the destination IP address in the request packet received from eNodeB.

Based on the details of the packet received, the P-GW (702) may make its decision to either forward the request further away (Internet (128) or MNO's local network (804)) or it sends a response immediately back to the same serving eNodeB (302) from which the P-GW received the packet. The P-GW may perform certain activities like policy enforcement, charging and the like before sending response to the eNodeB (302). The P-GW may also send edge connection details along with the response packet (906 of FIG. 9). Connection details may consist of IP address of the edge node.

On receiving the response packet from the P-GW, eNodeB does not simply strip the packet and send it to the radio network but may check for an edge flag (906 of FIG. 9) in the packet. If edge flag is true, it means that the packet is to be processed locally. In this case, the eNodeB may create a tunnel or connection between itself and the edge element with the IP address provided in the response packet sent by the P-GW. The eNodeB may also handles the multiple tunnel or connection ID for the same UE and a corresponding Radio bearer. So, basically there may be at least two separate tunnels or connections established for one UE. Once the edge session is established for a particular service for a particular UE, the eNodeB may record the information in the memory. All the subsequent calls can be directly forwarded to edge element from eNodeB itself until there is a special condition met for example service unavailable at edge, explicit termination of edge service notified by UE/User etc.

Figure 9:
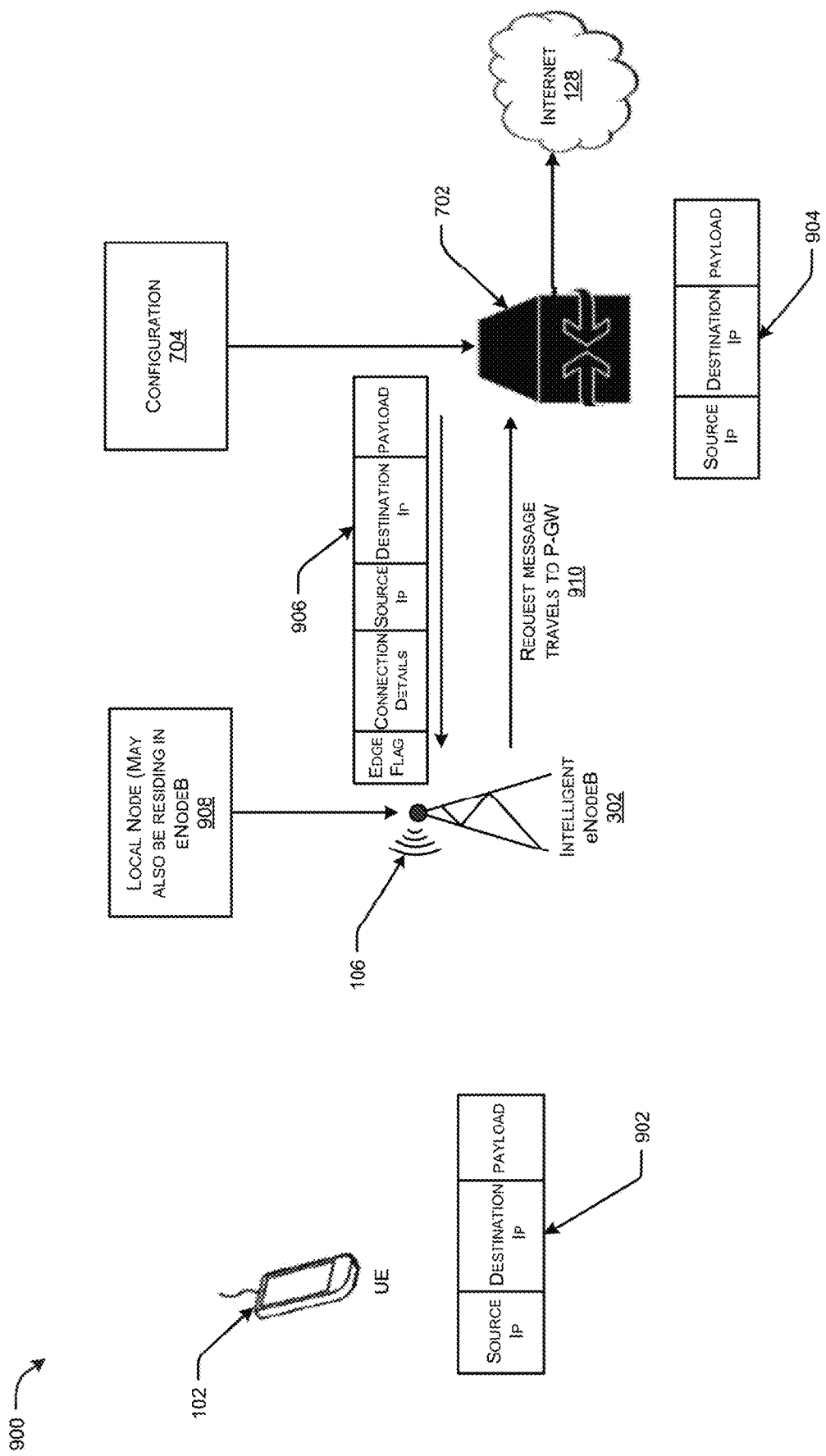
FIG. 9 illustrates an exemplary proposed Proposed IP Packet Routing in PGW in Architecture Solution II in accordance with an embodiment of the present disclosure.

In another embodiment, the flow and movement of data packets, the storage of configuration parameters and making of routing decisions is proposed and depicted in FIG. 9. In the proposed architecture solution II, a request data packet may originates from UE (102) consisting of its own IP address, Destination IP address and payload reaches at serving eNodeB (302) through an RF (Radio Frequency) channel (106). If the request for the current requested service is made for first time at this intelligent eNodeB (302) from the UE (102), it simply forwards the packet to network core where the P-GW (702) takes a routing decision based on the configuration available.

The IP packets reaching at P-GW, have the following fields available Source IPaddress (UE)

Destination IP address (IP address of the target server from which the desired service/application or content is requested)

Payload

As indicated in FIG. 8, after parsing and extraction of the information, the P-GW fetches the current available configuration (124) to check if the packet is required to be forwarded towards data network/internet or it can be processed locally. If there is no information available in the current configuration file at P-GW for a particular destination IP, then it simply forwards the packet towards data network/internet as per conventional technique (702). But, if the P-GW finds local routing entry in its configuration then, it makes a response packet with the following proposed extra fields (804).

a) Edge flag—True or false based on local processing possible or not for the requested service and enough authorization is available for the requesting UE.

b) Connection details—It may consist of IP address of local processing resource connected to serving eNodeB, authentication details, etc.

On receiving the response packet from the P-GW, the eNodeB, strips the received packet and check if it is required to directly feed to the Radio interface or requires further local processing. In case edge flag is true, eNodeB setup a.

Connection/tunnel with local edge element (Block-5) and route the packet to it as per the connection details provided in response packet.

There are two separate connection/tunnels that have been in operation, one for normal traffic flow (eNodeB to P-GW) and other one is between eNodeB & Edge element (eNodeB to Local Edge element).

Figure 10:
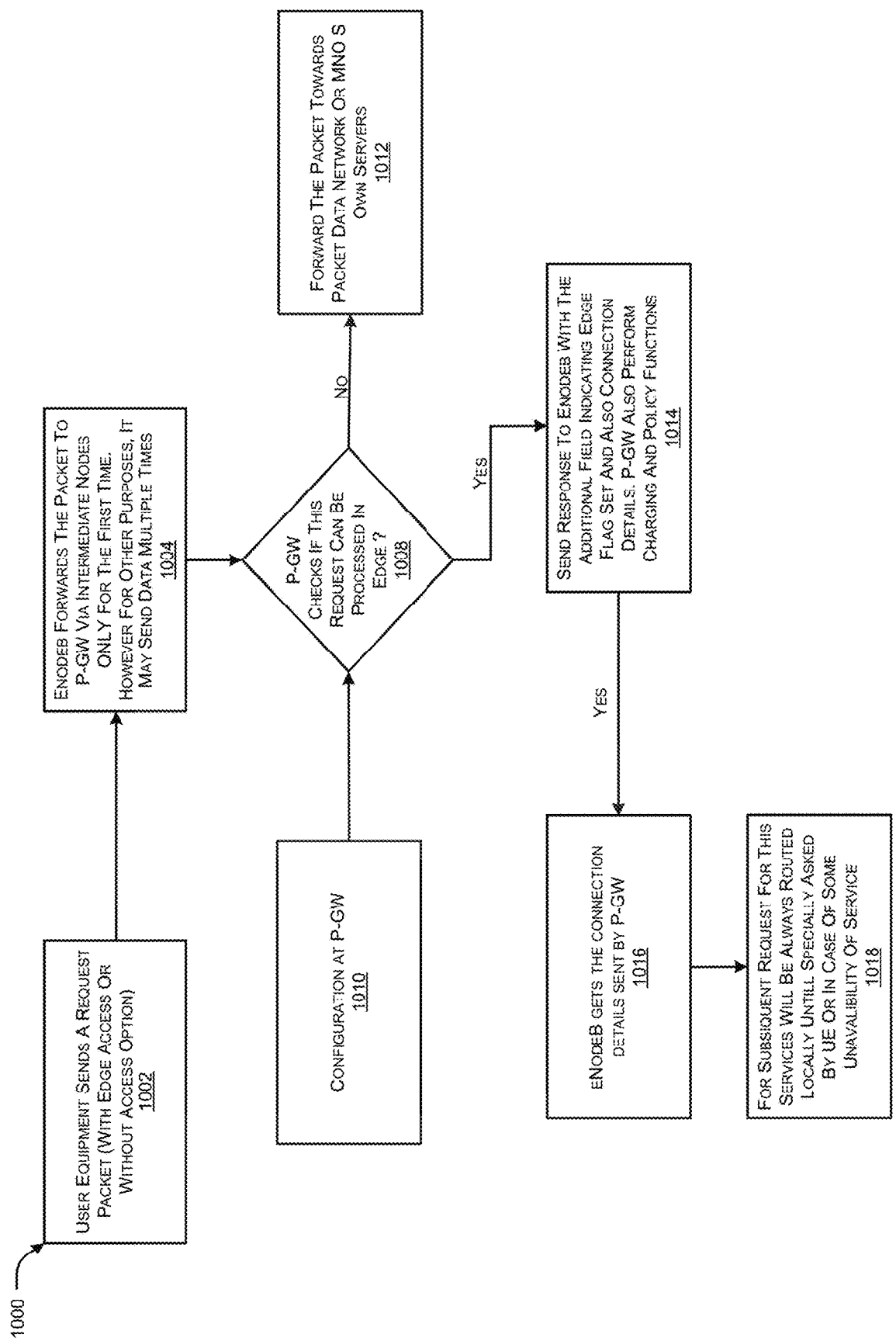
FIG. 10 illustrates an exemplary proposed Process Diagram for Logical Flow for routing in Architecture Solution II in accordance with an embodiment of the present disclosure.

In another embodiment, a diagram depicting the data flow and process of making the routing decisions as per Solution II architecture is shown in FIG. 10.

As illustrated, at block 1002, the UE sends a request packet with or without edge access option and at block 1004, the eNodeB forwards the packet to P-GW via intermediate nodes only for the first time. At block 1008, P-GW checks if the request can be processed through edge module. If configuration at P-GW at block 1010 is not available then at block 1012 forward the packet towards packet data network or MNO's own servers. Else if configuration at block 1010 is available, then at 1014 send response to the eNodeB with an additional field indicating edge flag set and also connection details. At block 1016, the eNode gets the connection details sent by the P-GW and at block 1018, for subsequent for the same service, it will be routed locally until specially asked by the UE or in case of some unavailability of service.

Figure 6:
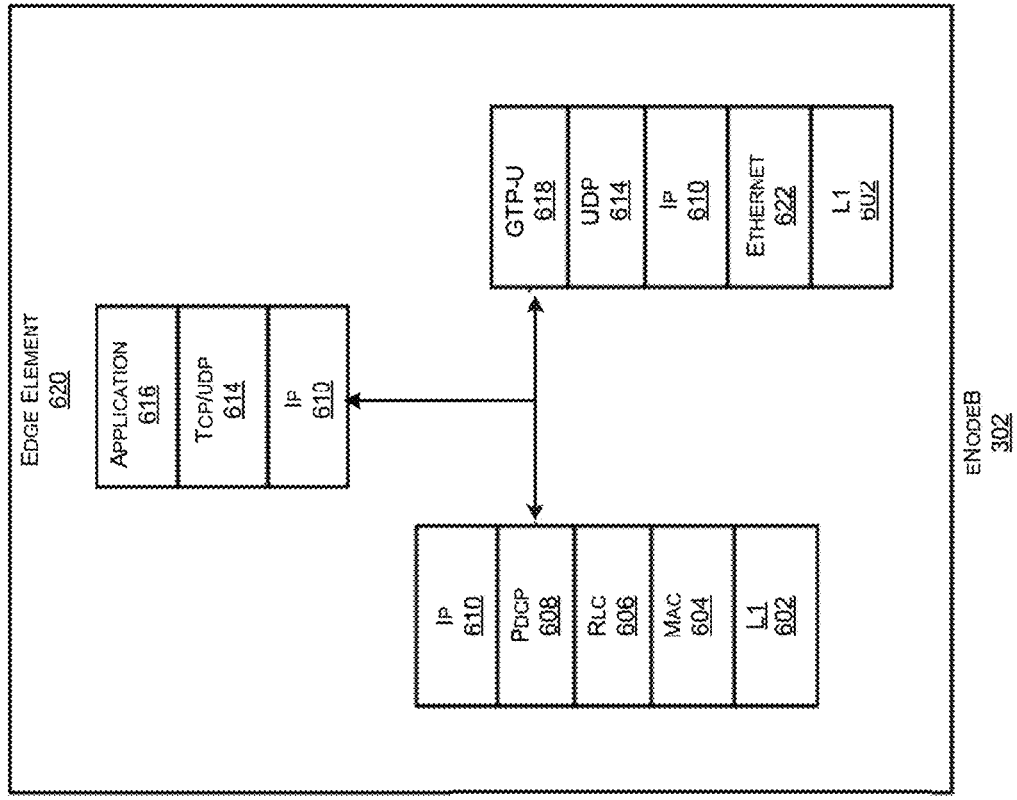
FIG. 6 illustrates an exemplary proposed Protocol Stacks in proposed intelligent eNodeB in accordance with an embodiment of the present disclosure.

The Protocol stack at intelligent eNodeB in Solution II architecture will remain same as in the Solution I architecture (FIG. 6).

In another embodiment, the proposed disclosure above together with data/content/application hosting mechanism in eNodeB, may implement various following use cases as follows:

Services and Applications: Any application applications/service or content can be delivered locally at Base Node level with the help of "intelligent routing ability". This mechanism shall reduce latency, increase data access bandwidth and all together shall provide an enhanced QoS. Further, this functionality can be exploited through multiple value added services such as below:

Premium Services: The application/services which are centrally stored or controlled centrally or remotely (at cloud level) may be replicated/cloned/copied at Base Node level to provide same service with an enhanced QoS. Example: Online Gaming solution, Online purchase/sell solution, Virtual non-real-time classroom etc.

Offline Data service: Common or usually accessed data/contents maybe replicated/transferred to Base Node from where it can be accessed by user locally without passing the request to internet or cloud. This shall enable MNO (Mobile Network Operator) to offer lesser tariff to user against data-usage. Example: Audio, video content, Local advertisement, Local purchase/sell solution.

"Localized" Area Networking Service: A private secure localized network bundled with computing resources can be provided to industries, organization, government etc. requiring local data storage, processing, analysis and actuation in a localized manner. Example: Real-time class-room sessions by schools/universities. Real time storage, processing and generate local alerts using video data from surveillance drones/cameras, Process management of industrial IoT applications.

Security: As the data/contents are stored locally, once uploaded the access may be restricted from global/remote (other than same/near-by Base Node or Telecom backhaul) access. This shall enhance the security aspect of data storage against intrusion at internet.

Platform for new application: The intelligent routing ability shall encourage and help MNO to set-up infrastructure for porting of complex next generation applications such as Block-chain nodes etc.

In another embodiment, the intelligent routing concept for LTE as described in the first Architecture and the second Architecture above may also be achieved in 5G Nodes as described below with the following approach:

(a) In the case of 5G, the base node i.e. Next Generation Base Node (gNB) protocol stack is divided into two sections i.e. Distributed unit (DU) and Centralized unit (CU). The CU node get access of the IP packets. The intelligent routing with Architecture-1 can be implemented in CU part of the gNB as described in the Architecture 1 above for the 4G LTE in paragraph 37.

(b) In 5G, the User Plane Function (UPF) plays the key role of gateway between core network and data network. For the second Architecture, intelligent routing can be achieved with user plane functions (UPF) and Next generation base node (gNB) as described in the second Architecture above for the 4G LTE in paragraph 43.

Both UPF and base node i.e., gNB collectively achieve intelligent routing in the second architecture.

In another embodiment, the invention items cover a system of making intelligent routing decision to route request/response locally avoiding the core network. This disclosure is currently available technologies including LTE/4G, 5G etc. and it can also be extended for similar next generation networks where edge routing could be implemented. For example, as explained in the sections above, in the case of LTE, edge element can be placed at Base Node and routing decisions can be made at base node itself as it contains all of the protocol layers where IP packet can be accessed. However, in the case of 5G, the Base Node (gNB) protocol stack is divided into at least two components i.e. Distributed unit (DU) and Centralized unit (CU). The higher level layers with IP packet visibility are available in CU. So, the CU part of Base Node in 5G is the place where edge element can be placed and routing decision can be made. Similarly, in future generation telecom network, the base node protocol stack may be divided into logical segments differently and more granular than 5G and may be placed physically at different locations but the concept of achieving the proposed intelligent routing shall remain the same because of the fundamental and essential need of converting RF packets into digital IP packets in any telecom network.

Figure 11:
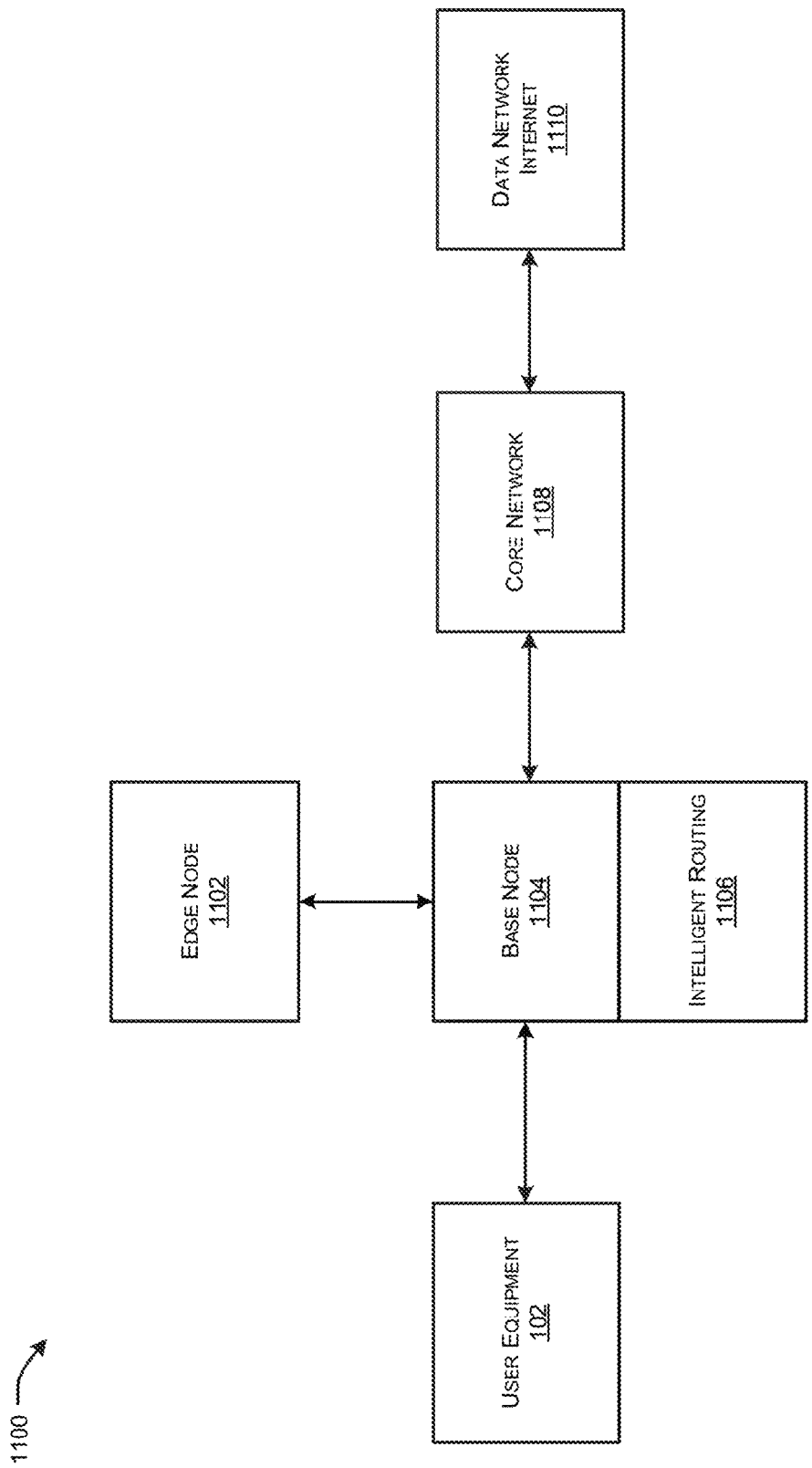
FIG. 11 illustrates an exemplary proposed block diagram for implementing intelligent routing (Technology Agnostic) in accordance with an embodiment of the present disclosure.

A block diagram of implementing intelligent routing which is technology agnostic is depicted in FIG. 11 below for implementation of the disclosure for all emerging future generation telecom network technologies. Although, in the drawings, specifically LTE has been depicted with existing and proposed routing, however, the same can also be achieved in 5G using the Control Unit (CU) and User Plane Function (UPF) instead of eNodeB and P-GW as in the case of LTE, 4G but not limited to the like. The high level architecture may include a UE (102), communicatively coupled to a base node (1104). The base node (1104) is further coupled to an edge module (1102) which make a decision for intelligent routing (1106). The base node (1104) is further communicatively to a core network (1108) and the internet (1100). The Control Unit in 5G itself may be distributed depending on the deployment scenarios, hence proposed intelligent edge routing shall be implemented accordingly.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

Advantages of the Present Disclosure

Some of the objects of the present disclosure, which at least one embodiment herein satisfies are as listed herein below.

The present disclosure provides an Edge solution that can introduce/incorporate certain intelligence at the Base Node so as to empower it with the ability to take decision by routing the requests originating from UE to reach the final destination.

The present disclosure provides an Edge solution that can introduce/incorporate certain Intelligence in both Base Node as well as in PGW/UPF to achieve the efficient routing.

The present disclosure provides an Edge solution that may provide reduction in latency for accessing data, which in turn, shall provide better user experience and enhance QoS (Quality of service).

The present disclosure provides an Edge solution that provides low bandwidth requirement at telecom-backhaul as well as Internet or centralized server/cloud network to serve more user requests with same infrastructure.

The present disclosure provides an Edge solution that enables increase in data privacy and security by restricting data availability at limited geographical and logical area.

The present disclosure provides an Edge solution help create infrastructure for computation and storage platforms to cater next generation applications such as Block-chain based solution, distributed computing, Localized network based industrial IoT solution etc.

The present disclosure provides a mechanism to achieve routing decision making ability at Base Node in the telecom network.

The present disclosure provides an new routing technique that shall directly or indirectly help to achieve low latency to access data by Fast delivery of services, applications and content, reduced DNS (Domain Name System) resolve time and localized consumer and industrial IoT.

The present disclosure provides a new routing technique that facilitates bandwidth utilization by effectively using MNO to serve more users as some of the load is handled at Base Node level itself and thereby reducing load on service/application provider.

The present disclosure provides anew routing technique that facilitates security by achieving distributed and localized security and privacy, adhering to government's General Data Protection Rules (GDPR) and security against cyber-attacks like DDOS etc.

We claim:

1. A system facilitating efficient routing in a telecommunication network, said system comprising:
one or more user equipment (UE) communicatively coupled to a radio network, said radio network comprising a first architecture and characterized in that:
a plurality of base nodes and one or more packet gateway nodes;
an edge module operatively coupled to one or more said base nodes, said routing server comprising a processor that executes a set of executable instructions that are stored in a memory, upon which execution, the processor causes the system to:
receive from said one or more UE a data packet for a destination computing device, said data packet associated for a request of a predefined service from the destination computing device;
parse, the data packet received for a first set of attributes pertaining to the destination computing device;
extract, the first set of attributes pertaining to the destination computing device;
determine a fastest route to said destination computing device from the first set of attributes extracted and a predefined set of instructions; and
route, said data packet to the destination computing device through said fastest route, wherein if the first set of attributes pertaining to the destination computing device are absent, the edge module fetches a current available configuration to check if the data packet is required to be forwarded to a core network or to any nearby base node.

2. The system as claimed in claim 1, wherein a second architecture comprises of the core network, wherein the core network further comprises an edge module operatively coupled to said one or more packet gateway nodes, and wherein the edge module is configured to:
receive from said one or more base nodes a data packet for a destination computing device;
parse, the data packet received for a first set of attributes pertaining to the destination computing device and a second set of attributes pertaining to authentication and security of the data packet;
extract, the first set of attributes and the second set of attributes pertaining to the destination computing device;
determine a fastest route to said destination computing device from the first set of attributes extracted and a predefined set of instructions; and
route, said data packet to the destination computing device through said fastest route.

3. The system as claimed in claim 1, wherein the edge module coupled to the packet gateway node enables storage of configuration parameters at the plurality of base nodes.

4. The system as claimed in claim 1, wherein the core network further comprises one or more packet gateway nodes, Mobility Management Entity (MME), Serving Gateway (S-GW) nodes, Home Subscriber System (HSS) and a combination thereof.

5. The system as claimed in claim 1, wherein the first architecture is used for routing in the absence of the second set of attributes, and wherein a third architecture comprises the edge module operatively coupled to both the base nodes and the packet gateway nodes such that routing decisions are made collectively.

6. The system as claimed in claim 1, wherein in the second architecture when a first time packet goes to the packet gateway module and the edge module, a connection information is received as a response, and wherein if there is a request for the service by the same destination device then the base node is configured to take the decision for routing.

7. The system as claimed in claim 1, wherein the first set of attributes pertaining to the destination computing device comprises a source IP address, a Destination IP address, and a Payload.

8. The system as claimed in claim 1, wherein the first architecture and the second architecture handles a request response handshaking communication.

9. The system as claimed in claim 1, wherein the packet gateway node of the second architecture stores more than one base node's configuration without a need to store a plurality of local configurations at each and every base node individually.

10. The system as claimed in claim 1, wherein based on the first and second set of attributes, said packet gateway node makes a decision to either forward the data packet to an external network or a local network or forward a response immediately back to the corresponding base node from which the packet gateway node received the data packet.

11. The system as claimed in claim 1, wherein the packet gateway node performs a first set of predefined instructions sending the response to the base node, wherein said packet gateway node also sends edge connection details along with the response, wherein on receiving the response packet from the packet gateway node, the corresponding base node checks for an edge flag in the data packet, and wherein if the edge flag is true, the data packet is to be processed locally.

12. A method facilitating efficient routing in a telecommunication network, said method comprising:
  receiving, by an edge module comprising a processor, a data packet for a destination computing device from one or more user equipment (UE), wherein said one or more UE are communicatively coupled to a radio network, said radio network comprising a first architecture and characterized in that a plurality of base nodes and one or more packet gateway nodes and an edge module operatively coupled to one or more said base nodes, and wherein said data packet is associated with a request of a predefined service from the destination computing device;
  parsing, by the processor, the data packet received for a first set of attributes pertaining to the destination computing device;
  extracting, by the processor, the first set of attributes pertaining to the destination computing device;
  determining, by the processor, a fastest route to said destination computing device from the first set of attributes extracted; and
  routing, by the processor, said data packet to the destination computing device through said fastest route, wherein if the first set of attributes pertaining to the destination computing device are absent, the edge module fetches a current available configuration to check if the data packet is required to be forwarded to a core network or to any nearby base node.

13. The method as claimed in claim 12, wherein a second architecture comprises of edge module operatively coupled to said one or more packet gateway nodes, and wherein the edge module is configured to perform the steps of:
  receiving from said one or more base nodes a data packet for a destination computing device;
  parsing, the data packet received for a first set of attributes pertaining to the destination computing device and a second set of attributes pertaining to authorization and security of the data packet;
  extracting, the first set of attributes and the second set of attributes pertaining to the destination computing device;
  determining a fastest route to said destination computing device from the first set of attributes extracted; and
  routing, said data packet to the destination computing device through said fastest route.

14. The method as claimed in claim 12, wherein the edge module enables storage of configuration parameters at the plurality of base nodes.

15. The method as claimed in claim 12, wherein the method further comprises the core network further comprising one or more packet gateway nodes, Mobility Management Entity (MME), Serving Gateway (S-GW) nodes, Home Subscriber System (HSS) and a combination thereof.

16. The method as claimed in claim 12, wherein the first architecture is used for routing in the absence of the second set of attributes, and wherein a third architecture comprises the edge module operatively coupled to both the base nodes and the packet gateway nodes such that routing decisions are made collectively.

17. The method as claimed in claim 12, wherein the data packet gets transmitted from the first architecture to the second architecture based on the second set of attributes extracted, and wherein once the second set of attributes are resolved, an incoming second data packet coming from the UE is handled by the first architecture independently.

18. The method as claimed in claim 12, wherein the first set of attributes pertaining to the destination computing device comprises a source IP address, a Destination IP address, and a Payload.

19. The method as claimed in claim 12, wherein the first architecture and the second architecture handles a request response handshaking communication.

20. The method as claimed in claim 12, wherein the packet gateway node of the second architecture stores more than one base node's configuration without a need to store a plurality of local configurations at each and every base node individually.

21. The method as claimed in claim 12, wherein based on the first and second set of attributes, said packet gateway node makes a decision to either forward the data packet to an external network or a local network or forward a response immediately back to the corresponding base node from which the packet gateway node received the data packet.

22. The method as claimed in claim 12, wherein the packet gateway node performs a first set of predefined instructions sending the response to the base node, wherein said packet gateway node also sends edge connection details along with the response, wherein on receiving the response packet from the packet gateway node, the corresponding base node checks for an edge flag in the data packet, and wherein if the edge flag is true, the data packet is to be processed locally.

* * * * *